United States Patent
Behrens

(10) Patent No.: US 6,474,966 B1
(45) Date of Patent: Nov. 5, 2002

(54) SLOT DIE FOR PRODUCING WEBS OF A FOAMED PLASTIC MATERIAL

(75) Inventor: Friedrich-Otto Behrens, Garbsen (DE)

(73) Assignee: Berstorff GmbH, Hannover (DE)

(*) Notice: Subject to any disclaimer, the term of this patent is extended or adjusted under 35 U.S.C. 154(b) by 0 days.

(21) Appl. No.: 09/719,447

(22) PCT Filed: May 7, 1999

(86) PCT No.: PCT/DE99/01445

§ 371 (c)(1),
(2), (4) Date: Jan. 5, 2001

(87) PCT Pub. No.: WO99/65666

PCT Pub. Date: Dec. 23, 1999

(30) Foreign Application Priority Data

May 19, 1998 (DE) .......................... 198 22 435

(51) Int. Cl.[7] ............................... B29C 47/16
(52) U.S. Cl. ..................... 425/4 C; 425/367; 425/381; 425/466; 425/817 C
(58) Field of Search ................. 425/327, 363, 425/367, 381, 382.4, 4 C, 466, 817 C

(56) References Cited

U.S. PATENT DOCUMENTS

| | | | | |
|---|---|---|---|---|
| 2,567,704 A | * | 9/1951 | Grimes | 425/466 |
| 3,394,431 A | * | 7/1968 | Nalle, Jr. | 425/327 |
| 3,647,329 A | * | 3/1972 | Reifenhauser et al. | 425/363 |
| 3,694,120 A | * | 9/1972 | Walton | 425/327 |
| 4,847,029 A | * | 7/1989 | Dietrich et al. | 425/363 |
| 5,224,838 A | * | 7/1993 | Baumgarten | 425/382.4 |
| 5,401,454 A | * | 3/1995 | Mendel | 425/382.4 |

* cited by examiner

Primary Examiner—Jan H. Silbaugh
Assistant Examiner—Joseph Leyson
(74) Attorney, Agent, or Firm—Cohen, Pontani, Lieberman & Pavane

(57) ABSTRACT

A slot die for producing webs of a foamed plastics material, into which die plastics material which has been plasticized under elevated pressure in an extruder and charged with a blowing agent enters, and through the die gap of which the plastics material is extruded by foaming. The die gap is formed by a pair of rollers mounted in a laterally sealed manner in the slot die. This achieves the effect that an advantageous formation of outer layers already occurs ahead of the die gap before the start of foaming.

2 Claims, 2 Drawing Sheets

SLOT DIE FOR PRODUCING WEBS OF A FOAMED PLASTIC MATERIAL

This is a U.S. national stage of application No. PCT/DE99/01445, filed on May 7, 1999. Priority is claimed on that application and on the following application: Country: Germany, Application No: 198 26 363.5, Filed Jun. 12, 1998.

BACKGROUND OF THE INVENTION

1. Field of the Invention

The invention relates to a slot die for producing webs of a foamed plastics material, into which die plastics material which has been plasticized under elevated pressure in an extruder and charged with a blowing agent enters, and through the cooled die gap of which the plastics material is extruded by foaming.

2. Discussion of the Prior Art

DE 17 79 374 has already disclosed, for the extrusion of articles of foamed thermoplastic material, having the slot die open directly into a calibrating device, which has pressure locks in which calibrating rollers are arranged. This is intended to achieve the effect that the extruded articles can be calibrated very exactly, for which purpose it is necessary to control the pressure in the pressure chambers correspondingly.

U.S. Patent No. 2,857,625 has also already disclosed arranging a cooled pair of rollers behind the die gap of a die. Here, however, free foaming of the plastics material already takes place before entry into the roller nip, since atmospheric pressure prevails in the space between. the die gap and the pair of rollers.

The known solutions have the disadvantage that, after leaving the die gap of the slot die, the plastics material foams before compressed outer layers are able to build up on both sides of the web, with the result that blowing agent can escape prematurely. This is disadvantageous for intensive foaming of the web. Added to this is the fact that the transverse expansion causes waves to form in the web between when it leaves the slot die and when it reaches the roller nip. In particular when alternative low-boiling blowing agents or blowing agents such as for example N2 and O2 are used, it is also necessary to work with higher blowing-agent pressures in the slot die. To ensure acceptable foaming behavior in this case, it is also necessary to cool the plastics material at the die lips of the slot die so intensively that outer layers are formed, in order in this way to prevent uncontrolled foaming of the emerging material. However, limits are prescribed here for the cooling, since the necessary intensive cooling may lead to the plastics material stagnating in the die lips. This causes an undefined constriction of the die gap, whereby the pressure and the flow in the die gap are adversely influenced.

SUMMARY OF THE INVENTION

The invention is based on the object of avoiding the disadvantages mentioned and of providing a slot die with which it is possible to produce webs of foamed plastics material accompanied by continuous foaming of the material.

This object is achieved according to the invention by the features of claim 1. Further development of the invention can be taken from the subclaims. Pursuant to this object, and others which will become apparent hereafter, one aspect of the present invention resides in the die zap being formed by a pair of rollers mounted in a laterally sealed manner in the slot die.

The fact that the die gap is formed by a pair of rollers mounted in a laterally sealed manner in the slot die achieves the effect that compressed outer layers of relatively high-viscosity plastics material already form on the emerging plastics material when it comes into contact with the surfaces of the rollers, as a result of cooling down, ahead of the die gap, i.e. before the start of the foaming operation. Since the pairs of rollers are rotating, the effect is obtained that the outer layers that are in contact are moved by the rollers of the pairs of rollers through the die gap, without stagnation and/or freezing occurring. Moreover, the plastics melt flowing onto the rollers always comes into contact with new regions of the surfaces of the rollers, which positively influences the temperature control of the melt. There is consequently the possibility of intensively cooling the emerging material, so that a formation of outer layers already occurs ahead of the die gap before the start of foaming. When it subsequently emerges from the die gap, foaming of the plastics material then takes place, but the outer layers keep the blowing agent in the foam core, so that intensive internal foaming of the web occurs. Consequently, highly foamed materials can be produced. In addition, the outer layers prevent waves from forming in the web, since transverse expansion cannot occur.

According to a preferred embodiment of the invention, the pair of rollers is provided on each of the two sides with a sealing thread, acting as a melt seal, as a lateral sealing means. The sealing thread may act either as a return conveying thread for the extruded melt or else as a sealing thread of an active melt seal, a sealant then being fed in from the outside in the sealing thread. The sealing thread ensures that no pressure drop takes place ahead of the die gap while the slot die is in operation.

It may also be provided within the scope of the invention that the rollers of the pair of rollers are of a frustoconical design and are displaceable axially with respect to each other. Such a design of the rollers makes it possible to set the thickness of the die gap by mutual axial displacement. The axial adjustment of the rollers is made possible in particular also by the sealing thread provided according to the invention.

BRIEF DESCRIPTION OF THE DRAWINGS

An exemplary embodiment is described in more detail below and is represented in the drawing, in which.

DETAILED DESCRIPTION OF THE PREFERRED EMBODIMENTS

Figure 1:
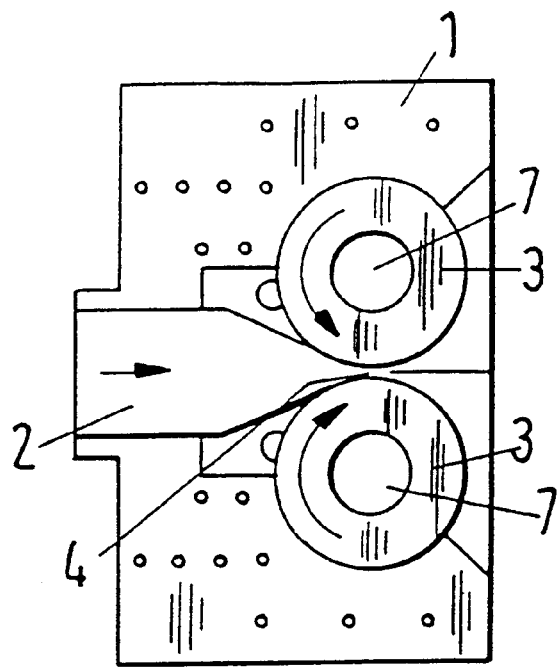
FIG. 1 shows a cross section through a slot die in a schematic representation.

In the drawing, 1 denotes a slot die, into the inflow channel 2 of which a melt prepared in an extruder and charged with blowing agent can be introduced. Arranged in the slot die 1 on the outlet side is a pair of rollers 3, which is formed by two rollers and forms a die gap of the slot die 1.

Figure 2:
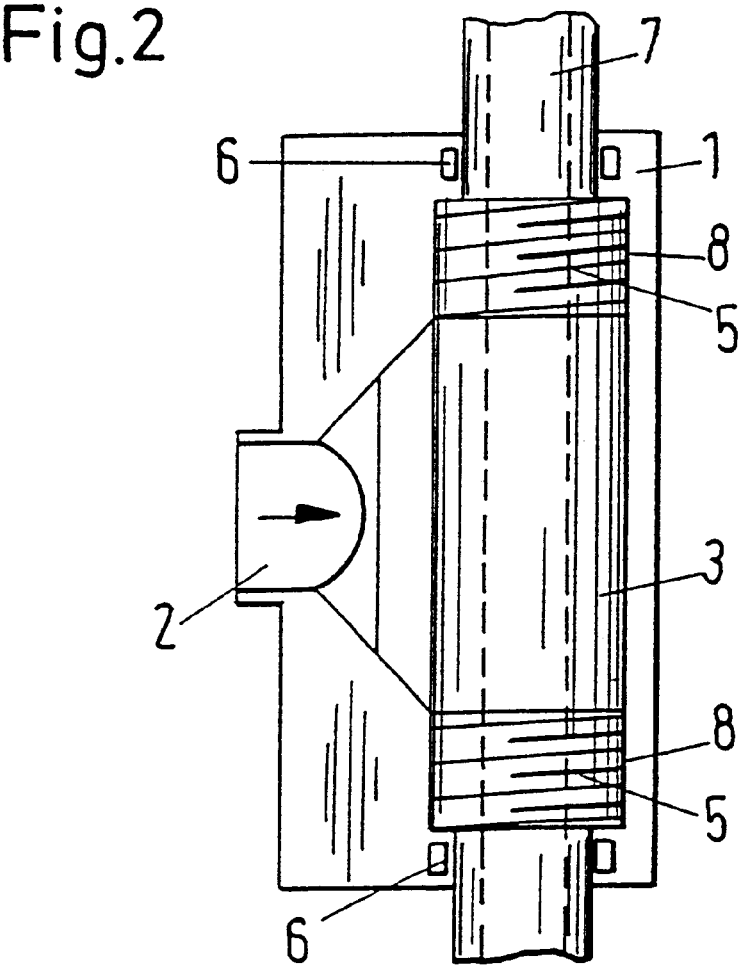
FIG. 2 shows a plan view of the slot die according to FIG. 1.
Figure 3:
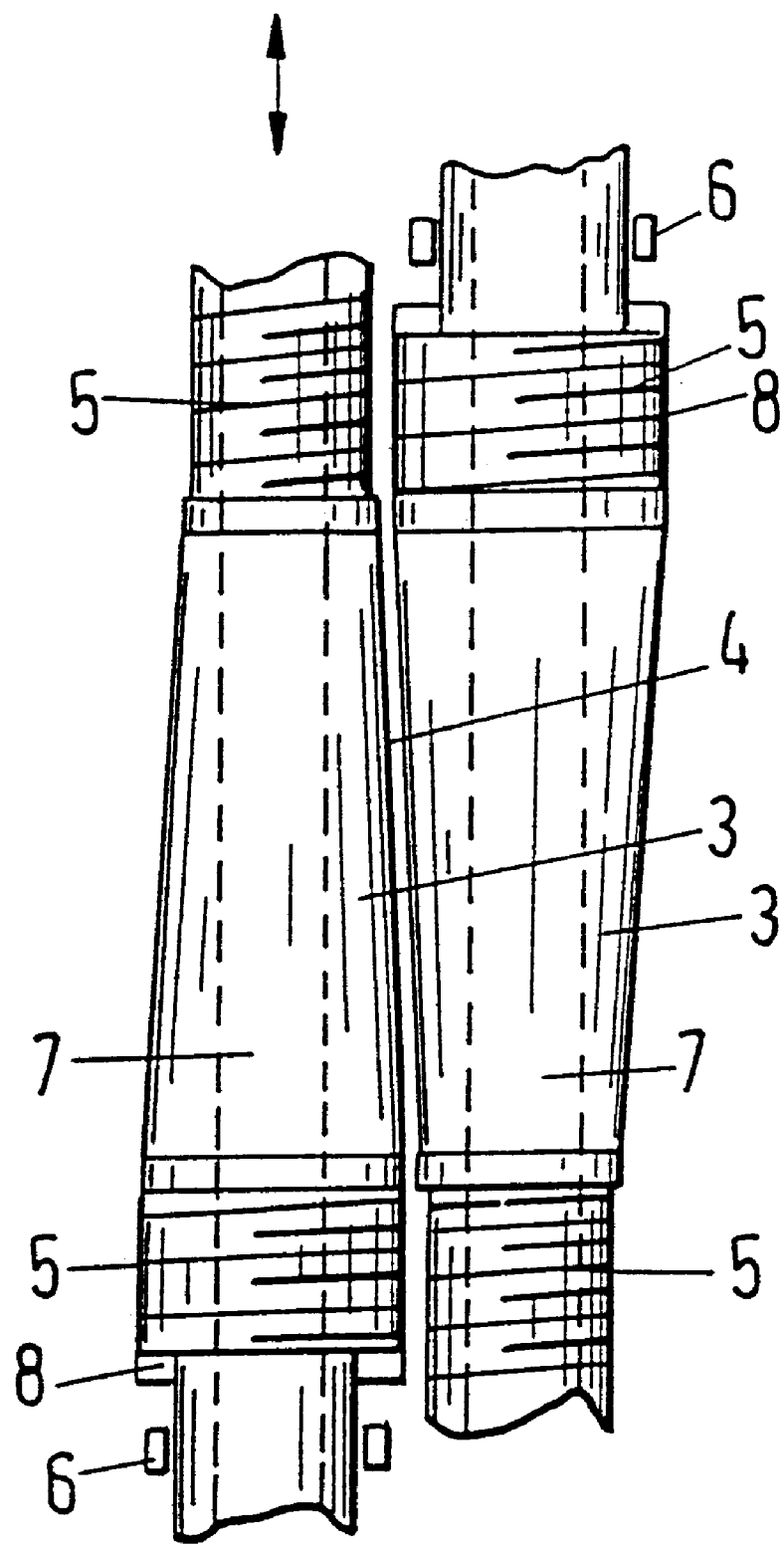
FIG. 3 shows a front view of a pair of rollers of the slot die according to FIG. 1.

As can be seen from FIGS. 2 and 3, the rollers of the pair of rollers 3 are laterally provided in each case with a sealing thread 5. The sealing threads 5 are closely enclosed in their sealing region in a way known per se by recesses in the housing of the slot die 1. Moreover, the rollers of the pair of rollers 3 are held in the slot die 1 in bearings 6. The rollers of the pair of rollers 3 may be both of a cylindrical design and, as represented in FIG. 3 of the drawing, of a frustoconical design in their region forming the die gap 4. The frustoconical design of the rollers of the pair of rollers 3 makes it possible to change the thickness of the die gap 4 and adapt it to the requirements of the extrusion by an axial adjustment of the rollers of the pair of rollers 3. The rollers of the pair of rollers 3 are provided, moreover, with a central channel 7, into which a coolant or a temperature-control medium can be introduced.

In the slot die 1, the blowing-agent-containing melt introduced into the slot die 1 via the inflow channel 2 reaches the inner side of the rotating rollers of the pair of rollers 3. On the surface of the rollers, the cooling down then causes a formation of compressed outer layers of relatively high-viscosity plastics material on. the plastics melt. The rotation of the rollers of the pair of rollers 3 makes the outer layers of the melt that are in contact be discharged together with the melt through the die gap 4, without any stagnation of melt occurring here. In this way, outer layers are formed at an early stage, pass the die gap 4 without being damaged and, when they emerge from the die gap 4, have the advantageous effect that the blowing agent cannot escape from the web during the foaming of the melt. Consequently, intensive internal foaming of the web occurs, so that altogether an optimally foamed product is obtained. The outer layers additionally prevent waves from forming in the foamed web, since any transverse expansion is suppressed.

The sealing threads 5 arranged on the rollers of the pair of rollers 3 prevent a pressure drop ahead of the die gap 4 of the slot die 1. The holder 8 provided in the housing of the slot die 1 is securely sealed in the region of the sealing thread 5. Alternatively, it is possible to feed rear-sealing melt to the sealing thread 5 in a way known per se.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A slot die for producing webs of a foamed plastics material, comprising: a housing; and a pair of rollers arranged in the housing so as to form a die gap through which plasticized plastics material is channeled under such a pressure that foaming of the plastics material only occurs after it leaves the die gap, the pair of rollers being mounted in a laterally sealed manner in the housing of the slot die so as to prevent a pressure drop in the plasticized plastics material before it leaves the die gap, the rollers of the pair of rollers being frustoconical and displaceable axially with respect to each other so that the thickness of the die gap is set.

2. A slot die as defined in claim 1, wherein the pair of rollers has two sides each provided with a sealing thread that acts as a melt seal and as a lateral sealing means which acts as one of a return conveying thread and a sealing thread of an active melt seal.

\* \* \* \* \*